E. J. R. BEATTEY.
EYEGLASS MOUNTING.
APPLICATION FILED JAN. 23, 1918.

1,307,477.

Patented June 24, 1919.

Inventor
Earle J. R. Beattey

By Howard E. Barlow
Attorney

UNITED STATES PATENT OFFICE.

EARLE J. R. BEATTEY, OF PROVIDENCE, RHODE ISLAND, ASSIGNOR TO UNIVERSAL OPTICAL CORPORATION, OF PROVIDENCE, RHODE ISLAND, A CORPORATION OF RHODE ISLAND.

EYEGLASS-MOUNTING.

1,307,477. Specification of Letters Patent. Patented June 24, 1919.

Application filed January 23, 1918. Serial No. 213,282.

*To all whom it may concern:*

Be it known that I, EARLE J. R. BEATTEY, a citizen of the United States, and resident of the city of Providence, in the county of Providence and State of Rhode Island, have invented certain new and useful Improvements in Eyeglass-Mountings, of which the following is a specification.

This invention relates to an eyeglass mounting, and has for its object to provide the bridge portion of the mounting with its ends or engaging portions substantially tangent to the periphery of the lens frame, whereby the very minimum pupilary distance between the lenses is obtained, or when it is not desired to so reduce this pupilary distance, much larger lenses may be set in a mounting of this construction.

With these and other objects in view, the invention consists of certain novel features of construction, as will be more fully described, and particularly pointed out in the appended claim.

Figure 1:
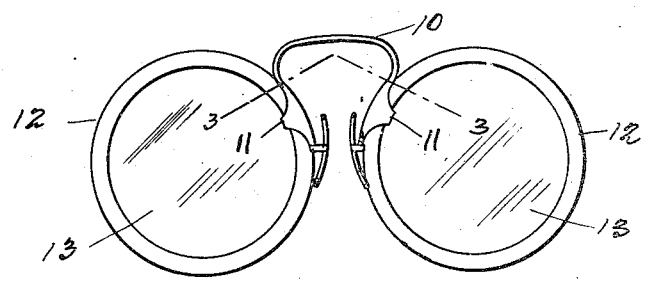

In the accompanying drawings:

Figure 1— is a rear elevation of my improved mounting attached to a pair of lens frames.

Figure 2:
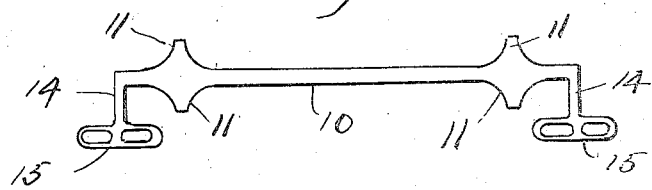

Fig. 2— is a detail showing the construction of the mounting as cut from sheet stock forming all of the parts integral.

Figure 3:
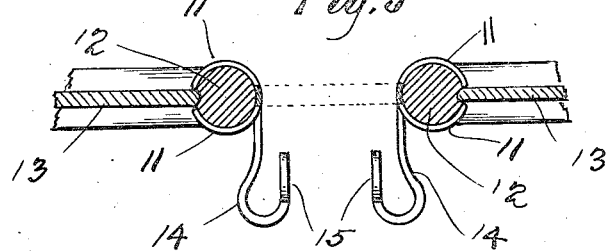

Fig. 3— is an enlarged sectional view on line 3—3 of Fig. 1 partly in section, showing portions of the lens frames; and showing the engaging portions as folded about these frames fastening the mounting thereto.

Referring to the drawings, 10 designates the bridge portion of my improved mounting, which portion is preferably formed of spring or resilient material which is tempered or hardened. Near the outer ends of this bridge portion the stock is left soft and here it is broadened to provide oppositely disposed laterally extending bendable portions 11 which are adapted to be folded about the frames 12 that carry the lenses 13 to permanently connect the mounting thereto.

I have also provided rearwardly extending arms 14 preferably formed integral with the bridge portion, near the ends thereof, see Fig. 2. On these arms are formed enlarged nose gripping plates 15, said arms being bent around the back, preferably in the form illustrated in Fig. 3, bringing the engaging faces of the grips opposite each other in position to engage and support the mounting on the nose of the wearer. These arms are bendable so that they may be adjusted by an optician, to fit the face of the wearer.

I have shown and described my improved eyeglass mounting as being applied to a lens set in an outer frame or rim which may be of celluloid or other non-metallic material, but the mounting may be applied or secured to the lenses direct if desired.

One of the features of this invention is the connecting of the bridge portion of the mounting substantially tangent to the periphery of the lens frame, whereby the pupilary distance of the lens may be reduced to the very minimum, or whereby lenses of the largest sizes may be set in this mounting if desired.

I have shown and described this eyeglass mounting as being provided with a spring bridge portion, but I do not wish to limit myself to this spring bridge construction, as a non-resilient bridge may be employed if desired such as those used in the spectacle type of mounting; neither do I limit myself to the forming of the clamping means integral with the bridge member as a separate clamping member may be employed for securing the two together if desired; and I also reserve the privilege of resorting to all the mechanical changes to which the device is susceptible, the invention being defined and limited only by the terms of the appended claim.

I claim:

A one-piece eyeglass mounting comprising a bow spring bridge having its side portions shaped to lie tangent to the inner edges of the opposite lens frames, said side portions each having an integral bendable clamping portion adapted to be folded about its adjacent lens frame and integral nose grips on the ends of said bridge.

In testimony whereof I affix my signature in presence of two witnesses.

EARLE J. R. BEATTEY.

Witnesses:
HOWARD E. BARLOW
A. F. MACREADY.